No. 689,736. Patented Dec. 24, 1901.
O. F. MILLER.
HUB.
(Application filed Aug. 10, 1901.)
(No Model.)

Witnesses
M. K. Guilford.
J. L. Eaton

Oscar F. Miller.
Inventor
by Edw. S. Duvall, Jr.
his Attorney

THE NORRIS PETERS CO., PHOTO-LITHO., WASHINGTON, D. C.

UNITED STATES PATENT OFFICE.

OSCAR FRANKLIN MILLER, OF DALLAS, PENNSYLVANIA.

HUB.

SPECIFICATION forming part of Letters Patent No. 689,736, dated December 24, 1901.

Application filed August 10, 1901. Serial No. 71,613. (No model.)

*To all whom it may concern:*

Be it known that I, OSCAR FRANKLIN MILLER, a citizen of the United States, residing at Dallas, in the county of Luzerne and State of Pennsylvania, have invented certain new and useful Improvements in Hubs, of which the following is a specification.

This invention relates to improvements in hubs for vehicle-wheels.

The object is to provide a vehicle-hub which will facilitate the renewal of worn or broken spokes without removing the tire and felly and which will permit resetting of the tire by persons who may be unskilled in the art. In the event of either contingency occurring while the vehicle is in use this hub readily enables one to repair damage to the spokes or to reset the tire at the place where the vehicle may be disabled.

With these and other objects and advantages in view the invention consists in certain novel and useful combinations of parts, as set forth in the following description and particularly pointed out in the claims annexed thereto and forming a part thereof.

Figure 1:
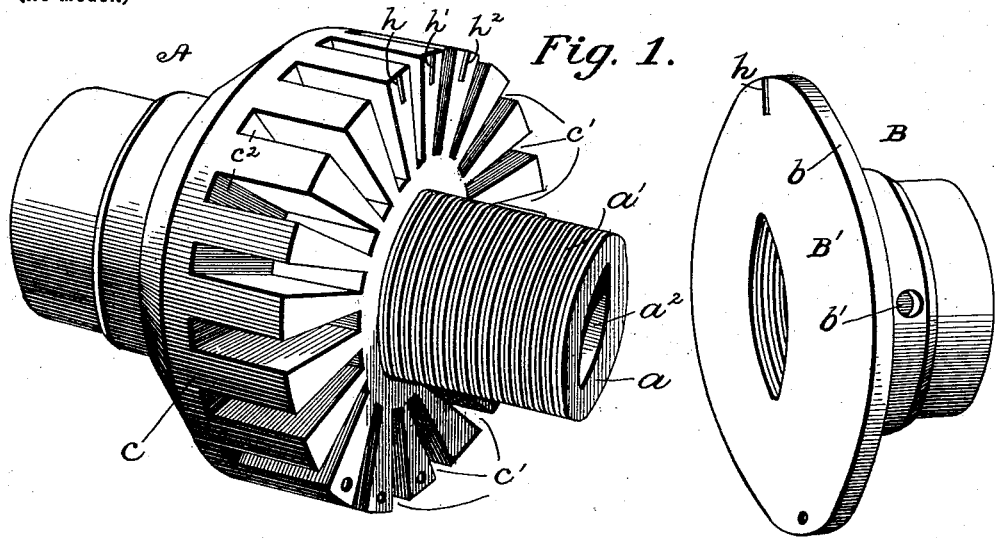
Figure 2:
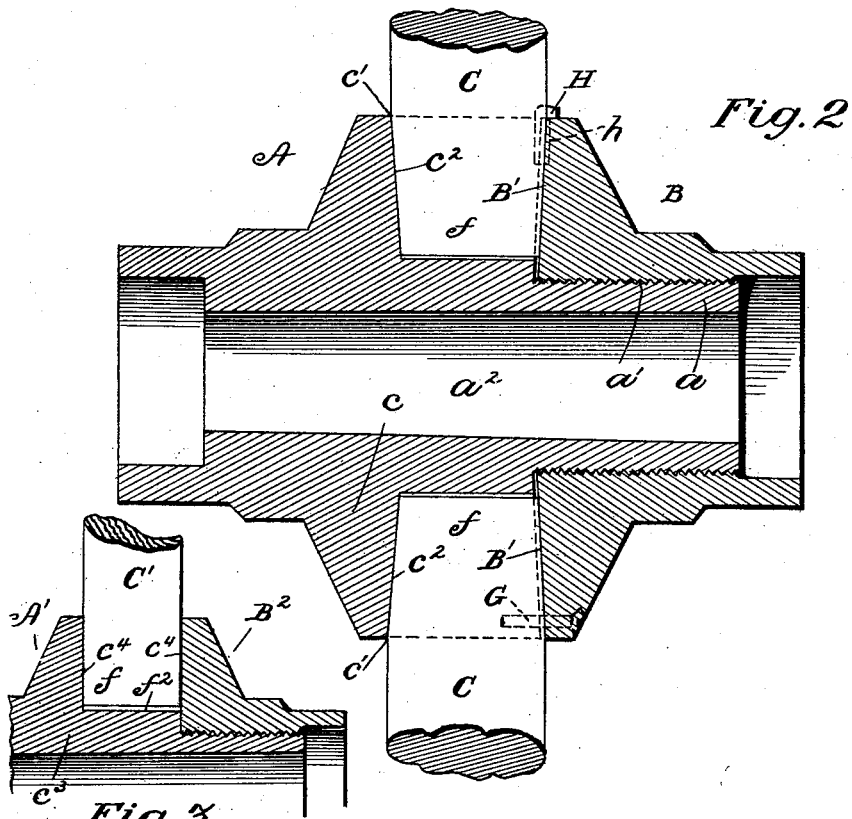
Figure 3:
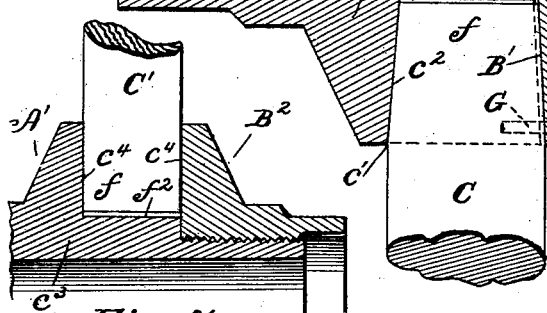

In the drawings illustrating this invention and accompanying and forming a part of this specification, Figure 1 is a perspective view of the hub disassembled. Fig. 2 is a longitudinal sectional view. Fig. 3 is a detail sectional view of a modified form of my invention.

Like letters of reference designate like parts in the several figures of the drawings.

In the practice of my invention I form the hub of two elements or members A and B. They are preferably formed of metal, and each may be cast or otherwise formed in one piece, as shown. The element A comprises the part $c$, which is mortised radially, as at $c'$, to provide seats or sockets for the spokes, and the barrel portion $a$, which is externally threaded to receive or enter the internally-threaded bore of the element B. The barrel portion $a$ may be of the same diameter throughout or gradually tapered to fit the form of axle-spindle. The end walls $c^2$ of the spoke sockets or seats are shown in Figs. 1 and 2 as slightly inclined from a vertical plane, so that when the element B, threading upon the barrel portion $a$, is locked in position the sockets for the spokes are gradually reduced or tapered toward their bottoms.

The element B is a sleeve internally threaded to engage with the threads $a'$ and is screw-threaded into position by a spanner-wrench which engages with the hole $b'$ on one side thereof. This element is provided with an integral annular flange $b$ with a conical face B', which secures the spokes C in place. To lock this element B in its engagement with the element A, I provide a key H and registering key-seats $h$, $h'$, and $h^2$, also a small threaded bolt or screw G, which may enter one of several screw-holes in the contiguous face of the element A. The ends $f$ of the spokes in this form of the invention are tapered or reduced to conform to the shape of the spoke-seats, and by this construction I am enabled to force the spokes outward from the hub center when it becomes desirable to tighten the tire by simply giving an extra turn to the element B. In order that the face B' of the element B may keep in contact with the spokes to force them against the wall $c^2$ with an upward tendency, the ends $f$ are slightly wider than the spoke-sockets. By having the several key-seats and screw-holes provision is made for locking the element B after each new adjustment.

In Fig. 3 I have shown another form of the invention. The elements A' and B² are similar in construction to the forms shown in Figs. 1 and 2, with the exception that the walls $c^4$ of the spoke-seats in the part $c^3$ of the hub and the face $c^4$ of the element B² are parallel. The ends $f'$ of the spokes C' are not tapered, and to tighten the tire I employ thin steel or other metal wedges $f^2$, which I force under the ends of the spokes to force them outward from the hub center.

In the drawings it will be observed that I have illustrated the construction with the element B next the wagon-body and the element A on the outside. This construction may be reversed—that is to say, the bore $a^2$ of the hub may be tapered in the opposite direction, so that the spindle of the axle may enter first through the element A.

From the foregoing construction it will be seen that I have provided a hub which will permit one to easily replace old, worn, or damaged spokes and to tighten the wheel-tires without great inconvenience or expense.

Having thus fully described my invention, what I claim as new, and desire to secure by Letters Patent of the United States, is—

1. A vehicle-hub formed of two interthreading elements, mortises or seats for the wheel-spokes in one of the elements, said spokes being clamped in place between the two elements, and means, located between the spoke mortises or seats, for preventing the elements from unthreading.

2. A vehicle-hub consisting of two interthreading elements or members, adapted to clamp the wheel-spokes between them, means for tightening and locking the two members, wedges designed to be inserted between each spoke-tenon and the bottom of the spoke seat or mortise, to cause the spoke to assume successive positions radially away from the hub center, and seats or mortises for said wheel-spokes, constructed to form mortise-and-tenon joints with the ends of the spokes in each successive position.

3. In a hub, the combination of two engaging elements or members, constructed to clamp the wheel-spokes between them, tapered spoke-seats between said members, constructed to admit of successive, outward, radial adjustments of the spokes, spokes having tenons tapered to correspond to the taper of the mortises but slightly wider than the same, means for adjusting and securing the spokes at various distances from the hub center, and means for locking or securing said hub members against independent movement.

4. In a hub, the combination of two engaging elements, spoke seats or mortises between said hub members, tapered to permit successive radial adjustments of the spokes outward from the hub center, spokes having tenons tapered to correspond with the taper of the spoke-mortises, but slightly wider than the same, a frusto-conical surface on the abutting face of one of the hub members, constructed to clamp in place and exert a pressure on the spokes outward from the hub center, and wedges designed to be inserted between each spoke-tenon and the bottom of the spoke mortise or seat.

In testimony whereof I affix my signature in presence of two witnesses.

OSCAR FRANKLIN MILLER.

Witnesses:
C. A. FRANTZ,
DANIEL PERRY.